TELEVISION MAGNETIC TAPE REPRODUCING SYSTEM

Filed Aug. 21, 1961

INVENTORS.
WILLIAM D. HOUGHTON &
ROBERT E. MOREY
BY Edward J. Norton
ATTORNEY

United States Patent Office 3,091,660

Patented May 28, 1963

3,091,660
TELEVISION MAGNETIC TAPE REPRODUCING SYSTEM

William D. Houghton, Princeton, and Robert E. Morey, Hamilton Square, N.J., assignors to Radio Corporation of America, a corporation of Delaware Filed Aug. 21, 1961, Ser. No. 132,854
9 Claims. (Cl. 178—6.6)

Figures 1, 2:
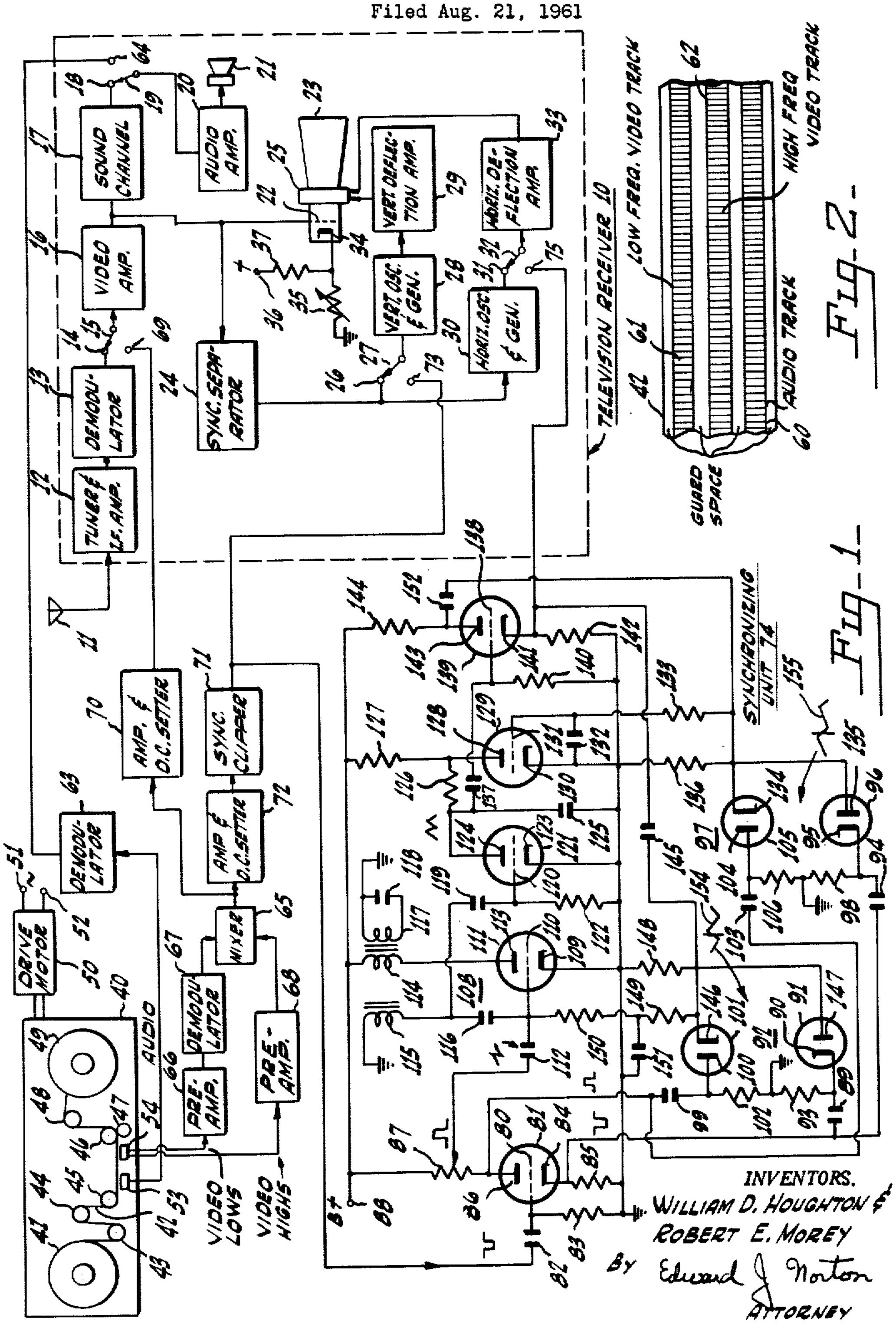

This invention relates to television magnetic tape reproducing systems and, particularly, to an improved and simplified television magnetic tape reproducing system capable of use with a standard television receiver.

Television magnetic tape reproducing systems presently available are specifically designed to meet certain commercial television broadcasting standards. Such systems are widely used by broadcasting companies and others interested in handling television signals forwarded over radio paths and other communication systems.

Because of the requirements placed on such magnetic tape reproducing systems, they tend to be complex in construction and operation. Elaborate servo systems, mechanical magnetic head arrangements and other arrangements both mechanical and electronic in nature are employed. In addition, skilled technicians are need to maintain and operate the systems. Because of the above factors, the systems are expensive and large in size.

The expense, size, complexity and other factors make the television magnetic tape reproducing systems presently available impractical for use in certain applications. For example, it is desirable to provide a television magnetic tape reproducing system capable of operation with the standard television receiver located in the home. There are other applications where the need for a television magnetic tape reproducing system does not justify the expense and use of the television magnetic tape reproducing systems presently available.

It is not required in these applications, such as home use, that the television magnetic tape reproducing system meet the commercial television broadcasting standards referred to above. Much of the servo control and other circuits required to meet these standards is not necessary, making it possible to reduce the size and expense of the magnetic tape reproducing system. At the same time, however, the simplified reproducing system must be able to satisfactorily reproduce a recorded television signal for viewing on a television receiver.

It is an object of this invention to provide an improved and simplified television magnetic tape reproducing system.

Another object is to provide an improved and simplified television magnetic tape reproducing system suitable for use directly with a standard television receiver.

A further object is to provide an improved television magnetic tape reproducing system including a synchronizing unit responsive to a reproduced synchronizing component for generating synchronizing signals by which the reproduced television signal can be accurately displayed on a standard television receiver.

A still further object is to provide an improved synchronizing unit for producing a sawtooth wave of constant peak-to-peak amplitude locked in frequency to a train of incoming pulses and relatively immune to random noise and momentary voids in the pulse train.

The foregoing objects and advantages of the invention are accomplished by an arrangement including a device for reproducing a television signal from a magnetic tape. The television signal includes both television and sound information. The reproduced sound component of the signal is fed from the device through suitable processing circuits to the sound channel of a standard television receiver for application to the loud-speaker of the receiver.

The reproduced television component of the signal is fed to the input circuit of the kinescope tube included in the television receiver. The sound and television component are applied to the proper circuits in the receiver by switching means arranged to select either the components are applied to the proper circuits in the receiver the components provided by the reproducing device.

The horizontal and vertical sync pulses are separated from the television component of the signal reproduced from the magnetic tape. The vertical sync pulses are fed through the above switching means to the vertical oscillator and deflection circuits located in the receiver.

Because of variations in the speed of the magnetic tape relative to the reproduce magnetic head, assuming the absence of complex servo loop control circuits, frequency distortions in the form of wow or flutter result in the reproduced television signal. This flutter occurs at a frequency such that, if the horizontal synchronizing pulses as reproduced were coupled to the conventional television receiver horizontal automatic frequency control circuits, the horizontal placement of the picture would vary. A horizontal picture jitter results since the raster would not accurately follow the time variations of the television signal reproduced from the magnetic tape.

According to the invention, the reproduced horizontal synchronizing pulses are fed to a synchronizing unit. The synchronizing unit produces a sawtooth wave which has a linear rise time starting at the exact time position of each reproduced sync pulse and lasting until the arrival of the next following pulse. The width of the horizontal kinescope trace is a direct function of the peak-to-peak amplitude of the sawtooth wave. The synchronizing unit also maintains constant the peak-to-peak amplitude of the sawtooth wave for all frequency variations of the sawtooth wave. The sawtooth wave produced by the synchronizing unit is fed through the above switching means to the horizontal deflection circuits located in the receiver. By the action of the synchronizing unit, the receiver will provide an accurate picture in response to the reproduced television signal which remains stationary within the raster on the kinescope screen.

The synchronizing unit is made relatively immune to noise and momentary voids in the horizontal sync pulses received by a circuit which stabilizes a horizontal pulse oscillator included in the unit. The stabilizing circuit permits a direct lock-in of the oscillator with the pulse input for only those pulses occurring within a predetermined time interval relative to the timing of the input pulses. If an input pulse is lost, the oscillator is capable of continued operation for that interval with only a slight change in normal timing.

A simplified television magnetic tape reproducing system is provided by the invention which permits the accurate display of a reproduced television signal by a standard television receiver.

The invention will now be described in connection with the accompanying drawing wherein:

FIGURE 1 shows partly in schematic circuit diagram and partly in block form one embodiment of a television magnetic tape reproducing system constructed according to the invention; and FIGURE 2 shows a section of magnetic tape having a television signal recorded thereon as might be used in the arrangement of FIGURE 1.

A standard television receiver 10 enclosed by dotted lines is shown in FIGURE 1. The receiver 10 includes an antenna 11 coupled to a tuner and intermediate frequency (IF) amplifier 12. The output of the tuner and IF amplifier 12 is coupled through a demodulator 13, contact 14 and wiper arm 15 to a video amplifier 16.

A first output of the video amplifier 16 is coupled over a path including the sound channel 17 of the television receiver 10, contact 18, wiper arm 19 and audio amplifier 20 to the loudspeaker 21 of the receiver 10.

The second output of the video amplifier 16 is coupled to the input grid 22 of the kinescope tube 23. The output of the video amplifier 16 is also coupled to a sync separator 24. The vertical synchronizing information is coupled from the sync separator 24 to the deflection means 25 of the kinescope tube 23 over a path including a contact 26, wiper arm 27, vertical oscillator and generator 28 and the vertical deflection amplifier 29. The horizontal synchronizing information is coupled from the sync separator 24 to the deflection means 25 over a path including the horizontal oscillator and generator 30, contact 31, wiper arm 32 and the horizontal deflection amplifier 33. The kinescope tube 23 is shown as including a cathode 34 coupled to a point of reference potential or ground via variable resistor 35 and to the positive terminal 36 of a power supply via resistor 37.

While the television receiver 10 is presented in FIGURE 1 in simplified form according to the above-defined blocks, it is to be understood that the television receiver 10 includes all of the circuits and components normally found in a standard television receiver. With the wiper arms 15, 19, 27 and 32 in the position shown in FIGURE 1, the television receiver 10 will operate as any other standard television receiver to receive and process a television signal applied thereto via antenna 11. Ground symbols have been omitted from the blocks included in the television receiver 10 and elsewhere on the drawing of FIGURE 1 for clarity and simplicity of the drawing. It is understood that such ground connections would be completed where and in the manner needed.

One example of a magnetic tape reproducing device 40 which might be used in the arrangement of the invention is shown in FIGURE 1. The reproducing device 40 includes a magnetic tape supply reel 41 upon which a magnetic tape 42 having a television signal recorded thereon is wound. The magnetic tape 42 is driven along a tape path over a first idler roller 43, a second idler roller 44, a third idler roller 45, a capstan or tape driving means 46 associated with a pinch roller 47, a fourth idler roller 48 and the magnetic tape take-up reel 49. The tape driving means included in the reproducing device 40 is operated by a suitable drive motor 50 connected to a power supply via terminals 51, 52. The reproducing device 40 includes a sound reproducing head 53 and a television reproducing head 54.

In the embodiment of the invention illustrated in FIGURE 1, a typical reproducing device 40 is shown, by way of example, which is of a type capable of reproducing television signals recorded on the magnetic tape 42 in the manner shown in FIGURE 2. The magnetic tape 42 which is one quarter inch wide is driven past the reproduce heads 53 and 54 at a speed of 120 inches per second. The device 40 has a 2 megacycle response.

As shown in FIGURE 2, the television signal is recorded on three separate tracks extending along the length of the magnetic tape 42. The audio component of the television signal of 100 cycles to 10 kilocycles frequency modulates a carrier of 90 kilocycles. The frequency modulated carrier is recorded on a first track 60 indicated as the audio track and extending along one edge of the tape 42. The audio track is 15 mils wide.

The television component of the television signal is divided according to frequency into two signals prior to recording. The low frequency portion of say 10 cycles to 300 kilocycles frequency modulates a carrier of 600 kilocycles. The resulting frequency modulated carrier is recorded with suitable bias on the low frequency video track 61 along the edge of magnetic tape 42 opposite to that along which the audio track 60 extends.

The high frequency or remaining portion of the television component of 300 kilocycles to 2 megacycles is recorded with suitable bias directly on the third track 62 indicated as the high frequency video track. The tracks

61, 62 may each be 40 mils wide, requiring a total of one-eighth inch for all three tracks 60, 61 and 62 plus guard separation space.

The sound reproduce magnetic head 53 included in the reproducing device 40 and constructed in a known manner is positioned relative to the magnetic tape 42 so as to reproduce the sound component of the television signal recorded on the audio track 60. The reproduced sound component is fed from the head 53 through a demodulator 63 to a contact 64 associated with wiper arm 19 in the television receiver 10.

The television reproduce head 54 includes a first and second magnetic head means positioned with relation to the magnetic tape 42 so as to reproduce respectively the intelligence recorded on the video tracks 61 and 62. The signal reproduced from the low frequency video track 61 by the head 54 is applied from the head 54 to a mixer 65 over a path including pre-amplifier 66 and demodulator 67.

The signal reproduced from the high frequency video track 62 by the head 54 is applied to the mixer 65 over a path including a pre-amplifier 68. Pre-amplifiers 66 and 68 serve to equalize the low and high frequency components in accordance with the characteristics of the tape 42 and reproducing head 54. The low and high frequency components are combined in the mixer 65 to form a single wideband video wave at, for example, a one volt peak-to-peak level.

The output of mixer 65 is coupled to a contact 69 associated in the television receiver 10 with wiper arm 15 through an amplifier and direct current setter 70. The direct current setter included with the amplifier 70, by being referenced to an appropriate bias voltage, permits restoration of the direct current components.

The single wideband reproduced television signal appearing at the output of mixer 65 is also coupled to a synchronizing clipper 71 through an amplifier and D.-C. setter 72. The synchronizing clipper 71 separates the vertical and horizontal synchronizing pulses from the reproduced television signal. The vertical synchronizing pulses are applied from the synchronizing clipper 71 to a contact 73 associated with the wiper arm 27 in television receiver 10.

The horizontal synchronizing pulses are applied from the output of sync clipper 71 to a synchronizing unit 74 to be described in detail. The synchronizing unit 74 is responsive to the reproduced horizontal synchronizing pulses applied thereto to generate a sawtooth wave which is applied to a contact 75 associated with the wiper arm 32 in the television receiver 10.

Referring to the synchronizing unit 74, negative horizontal synchronizing pulses appearing at the output of sync clipper 71 and having a nominal frequency of 15,750 cycles per second are applied to the control grid 80 of a phase inverter tube 81 over a path including capacitor 82. A resistor 83 is connected between the control grid 80 and a point of reference potential or ground. The tube 81 includes a cathode 84 connected to the point of reference potential through a resistor 85 and a plate 86 connected to the positive terminal 88 of a source of direct current potential through a potentiometer 87.

The cathode 84 of phase inverter tube 81 is coupled by a capacitor 89 to the cathode 90 of a diode 91 included in a dual-diode frequency control phase comparator 92. The cathode 90 of diode 91 is connected to the point of reference potential through resistor 93. The cathode 84 of phase inverter tube 81 is also coupled through a capacitor 94 to the cathode 95 of a diode 96 included in a dual-diode slope control phase comparator 97. The cathode 95 of diode 96 is connected to the point of reference potential through a resistor 98.

The plate 86 of phase inverter tube 81 is coupled through a capacitor 99 to the plate 100 of the second diode 101 included in the frequency control phase comparator 92. The plate 100 of diode 101 is connected to the point of reference potential through resistor 102. The plate 86 of phase inverter tube 81 is also coupled through a capacitor 103 to the plate 104 of the second diode 105 included in the slope control phase comparator 97. The plate 104 of diode 105 is connected to the point of reference potential through resistor 106.

The positive pulses appearing at the plate 86 of phase inverter tube 81 are applied to the control grid 110 of a pulse oscillator tube 111 over a path including the variable tap on potentiometer 87 and a capacitor 112. The cathode 109 of pulse oscillator tube 111 is connected directly to the point of reference potential, and the plate 113 of the pulse oscillator tube 111 is connected to the positive terminal 88 through winding 114 of a feedback transformer. The feedback winding 115 of the feedback transformer is connected at one end to the point of reference potential and at the other end to the control grid 110 of pulse oscillator tube 111 through a capacitor 116.

The feedback transformer including windings 114, 115 also includes a third stabilizing winding 117. The stabilizing winding 117 is tuned by a capacitor 118, the junction of winding 117 and capacitor 118 being connected to the point of reference potential. The stabilizing network including winding 117 and capacitor 118 tends to maintain the pulse oscillator including tube 111 and indicated generally by reference numerals 108 at the horizontal synchronization pulse rate of 15,750 cycles per second so that the frequency of the pulse oscillator 108 cannot change rapidly.

The output pulses of the pulse oscillator 108 appearing at the junction of winding 115 and capacitor 116 are coupled through a capacitor 119 to the control grid 120 of a triode tube 121 included in the discharge circuit of a sawtooth generator. The control gird 120 is connected to the point of reference potential through a resistor 122, and the cathode 123 of tube 121 is connected directly to the point of reference potential. The plate 124 of tube 121 is connected through a capacitor 125 to the point of reference potential and through resistors 126 and 127 to the positive terminal 88. Tube 121, resistor 126 and capacitor 125 form a sawtooth wave generator.

The junction of resistors of 126 and 127 is connected to the plate 128 of a sawtooth wave slope control tube 129. The cathode 130 of tube 129 is connected directly to the point of reference potential. The control grid 131 of the tube 129 is connected to the point of reference potential through a capacitor 132. The control grid 131 is also connected through a resistor 133 to the cathode 134 of the first diode 105 and to the plate 135 of the second diode 96 included in the slope control phase comparator 97. The plate 135 of diode 96 and the cathode 134 of diode 105 in the slope control phase comparator 97 are connected to the point of reference potential through a resistor 136.

The sawtooth wave appearing at the junction of resistor 126 and capacitor 125 is coupled through a capacitor 137 to the control grid 138 of a sawtooth wave output amplifier 139. The control grid 138 is connected to the point of reference potential through a resistor 140. The cathode 141 of the amplifier tube 139 is connected through a resistor 142 to the point of reference potential, and the plate 143 of amplifier tube 139 is connected through a resistor 144 to the positive terminal 88.

The sawtooth wave output of the synchronizing unit 74 is applied from the cathode 141 of amplifier tube 139 to the contact 74 associated with wiper arm 32 in the television receiver 10.

The output sawtooth wave appearing at the cathode 141 of amplifier tube 139 is applied through a capacitor 145 to the cathode 146 of the first diode 101 and the plate 147 of the second diode 91 included in the frequency control phase comparator 92. The cathode 146 of diode 101 and the plate 147 of diode 91 are coupled to the point of reference potential through a resistor 148, and are also coupled to the control grid 110 of the pulse oscillator tube 111 through resistors 149, 150. The junction of resistors 149 and 150 is connected to the point of reference potential through a capacitor 151. Resistor 149 and capacitor 151 constitute a filter network with a time constant of a value equal to approximately three television lines.

The sawtooth wave appearing at the plate 143 of amplifier tube 139 which is of opposite polarity to that appearing at the cathode 141 is applied through a capacitor 152 to the cathode 134 of diode 105 and plate 135 of diode 96 included in the slope control phase comparator 97.

In the operation of the invention, an operator wishing to display a television signal reproduced from magnetic tape 42 by reproducing device 40 in television receiver 10, operates the wiper arms 15, 19, 27, and 32 to the contacts 69, 64, 73 and 75, respectively. The wiper arms 15, 19, 27 and 32 are preferably ganged together for simultaneous operation by any suitable means. The television receiver 10 may be provided with an input jack and a simple multiple contact switch to switch the receiver from "air" to "tape" signals, in the same manner as a phonograph switch is presently used.

The reproducing device 40 is placed in operation. The reproduced sound component picked up from track 60 on the magnetic tape 42 by reproduce head 53 is applied to the loudspeaker 21 in television receiver 10 over a path including demodulator 63, contact 64, wiper arm 19, and audio amplifier 20. The high and low frequency signals of the television signal recorded on tracks 62 and 61, respectively, of magnetic tape 42 are reproduced by the reproduce head 54, processed in the pre-amplifiers 66, 68 and demodulator 67, and added in the mixer 65 to form a single wide band television signal at, for example, a one volt peak-to-peak level. The reproduced television signal is applied from mixer 65 through amplifier 70, contact 69 and wiper arm 15 to video amplifier 16. The amplified reproduced television signal having, for example, a 40 volt peak-to-peak level is coupled directly to the grid 22 of kinescope tube 23 in the television receiver 10. While the reproduced television signal is shown as being fed through the video amplifier 16 in receiver 10, the reproduced television signal can be fed in certain applications directly from the amplifier 70 to the input of kinescope tube 23 by-passing the video amplifier 16.

The reproduced television signal is also applied from mixer 65 to the sync clipper 71 through amplifier 72. The vertical synchronizing pulses separated from the reproduced television signal are applied to the deflection means 25 of the kinescope tube 23 in receiver 10 over a path including contact 73, wiper arm 27, vertical oscillator and generator 28 and the vertical deflection amplifier 29.

While the horizontal synchronizing pulses included in the reproduced television signal and appearing at the output of sync clipper 71 have a nominal frequency of 15,750 cycles per second, the actual frequency of the horizontal synchronizing pulses varies as a function of the variations in the speed of the magnetic tape 42 relative to the reproduce head 54. The resulting distortion occurs at a frequency such that, if the horizontal synchronizing pulses were coupled directly to the horizontal deflection circuits in the television receiver 10, the horizontal placement of the picture would vary causing a horizontal picture jitter. The raster would not accurately follow the time variations of the reproduced television signal.

According to the arrangement of the invention, the horizontal synchronizing pulses are applied as a train of negative pulses from the sync clipper 71 to the control grid 80 of the phase inverter tube 81 in the synchronizing unit 74. The positive pulses appearing at the plate 86 of phase inverter tube 81 are applied to the control grid 110 of the pulse oscillator tube 111, the pulse oscillator tube 111 being made conducting for each incoming pulse applied thereto.

Diodes 91 and 101 included in the frequency control phase comparator 92 operate as gated clamp networks in response to the pulses applied thereto from the cathode 84 and plate 86, respectively, of phase inverter tube 81 to sample the negative sawtooth wave applied to the diodes 101 and 91 from the cathode 141 of the amplifier tube 139. Assuming that the frequency of the pulses applied to the control grid 110 of pulse oscillator tube 111 is at the frequency of the pulse oscillator or 15,750 cycles per second, the frequency control phase comparator 92 will sample the negative sawtooth wave applied thereto at approximately the center of the trailing edge thereof as indicated by the cross-over point on waveform 154. Diodes 91 and 101 conduct substantially equally, and a zero control voltage appears at the junction of resistor 149 and capacitor 151.

As the frequency of the pulses applied to the control grid 110 of the pulse oscillator tube 111 and therefore the frequency of the horizontal synchronizing pulses in the reproduced television signal differs from the normal operating frequency of the pulse oscillator or 15,750 cycles per second, diodes 91 and 101 conduct at correspondingly different levels and the frequency control phase comparator 92 produces a plus or minus control voltage of an amplitude which is a function of the position of the incoming pulses relative to the center portion of the trailing, linear slope or edge of the sawtooth wave.

The control voltage applied from the junction of resistor 149 and capacitor 151 to the control grid 110 of the pulse oscillator tube 111 causes the frequency of the pulse oscillator 108 to follow that of the incoming pulses from phase inverter tube 81. The frequency control circuit including phase comparator 92 varies the pulse oscillator 108 firing time at a rate sufficient to follow approximately the reproduced horizontal synchronizing pulses. The frequency of the pulse oscillator 108 is then directly locked to that of the horizontal synchronizing pulses. The pulse oscillator 108 operates to produce a train of pulses having the frequency of the horizontal synchronizing pulses applied to the phase inverter tube 81 from the sync clipper 71. By determining the value of resistor 149 and capacitor 151 such that the filter network has a time constant of a value approximately equal to 3 television lines, the frequency of the pulse oscillator 108 does not change rapidly in response to high frequency noise pulses but remains stable at the controlled frequency. The stabilization circuit including winding 117 and capacitor 118 also functions to stabilize the frequency of the pulse oscillator 108 so that the frequency cannot change rapidly.

Tube 121, resistor 126 and capacitor 125 form a sawtooth wave generator. Capacitor 125 normally charges through resistor 126 and resistor 127. Each pulse from the pulse oscillator 108 causes tube 121 to conduct and to discharge the capacitor 125. The resulting sawtooth wave appearing at the junction of resistor 126 and capacitor 125 is applied to the amplifier tube 139.

The pulses generated by the pulse oscillator 108 are locked in frequency with the reproduced horizontal synchronizing pulses applied to phase inverter tube 81. As the frequency of the reproduced horizontal synchronizing pulses and therefore the frequency of the pulses applied to the tube 121 changes, a corresponding change takes place in the period of discharge of capacitor 125. The peak-to-peak amplitude of the sawtooth wave produced varies accordingly. Since the width of the horizonal kinescope trace is a direct function of the peak-to-peak amplitude, this condition would result in a staggered display on the kinescope tube 23 in television receiver 10 with the horizontal lines of different lengths.

According to the invention, the slope control phase comparator 97 operates to sample the positive sawtooth wave applied thereto from the plate of amplifier tube 139 by the pulses applied to the phase comparator 97 from the phase inverter tube 81. Diodes 96 and 105 in the phase comparator 97 are set to conduct substantially equally when the pulses applied thereto occur at the center portion of the trailing edge of the sawtooth wave as indicated by the crossover point of waveform 155. As the position of the pulses changes relative to the center portion of the sawtooth wave slope, one or the other diode 96 or 105 conducts more heavily. A plus or minus direct current control voltage varying in amplitude according to the frequency change is applied from the phase comparator 97 to the control grid 131 of tube 129 through resistor 133.

Tube 129 conducts at a level determined by the control voltage, and acts as a variable resistance in the charging circuit of capacitor 125. The charging rate of capacitor 125 varies according to the change in the voltage applied to resistor 126. The slope of the sawtooth wave varies with changes in frequency of the horizontal synchronizing pulses in the reproduced television signal. A constant peak-to-peak amplitude sawtooth wave is obtained for all variations in the frequency of the reproduced horizontal synchronizing pulses.

The time constant of the filter network including resistor 133 and capacitor 132 is chosen to be of a value such that the slope of the sawtooth wave does not change appreciably during one television line in order to prevent non-linearity in the rise time of the sawtooth wave.

A feature of the invention is the arrangement of the pulse oscillator 108 by which the phase and frequency of the sawtooth wave produced by the synchronizing unit 74 is relatively immune to random noise introduced in the train of reproduced horizontal synchronizing pulses and momentary signal losses resulting from magnetic voids in the coating of magnetic tape 42. The pulse oscillator 108 is stabilized by a circuit which permits the pulse oscillator 108 to lock in frequency with only those pulses occurring within a predetermined time interval relative to the timing of the reproduced horizontal synchronizing pulses.

The time constant of the filter network including resistor 149 and capacitor 151, the input pulse amplitude determined by the setting of potentiometer 87 and the degree of coupling of winding 117 in the stabilization circuit are set so that the tube 111 is triggered or made to conduct in response to each pulse applied thereto just before the normal self-triggering or firing time of the pulse oscillator 108. Allowing for the normal limiting action of the sync clipper 71, the potentiometer 87 is set so that a noise pulse occurring more than .15 microsecond before the normal receive time of a reproduced synchronization pulse cannot trigger the pulse oscillator 108. Should a noise pulse be received after a reproduced synchronizing pulse has appeared, the pulse oscillator 108 will have been already triggered by the incoming pulse from phase inverter tube 81, and the noise pulse will have no effect.

Should a momentary void occur in the reproduced horizontal synchronizing pulse train such that a horizontal synchronizing pulse does not appear at its normal time, the pulse oscillator 108 stabilized by the circuit including winding 117 and capacitor 118 will trigger by regenerative action in an interval less than .15 microsecond after the expected arrival time of the missing pulse with only a slight change in timing. The pulse oscillator 108 supplies the missing pulse. Any noise pulses occurring after the pulse oscillator tube 111 has become conducting will have no effect.

Synchronizing unit 74 generates a sawtooth wave for application to the horizontal deflection circuits of television receiver 10 having a constant peak-to-peak amplitude and synchronized in frequency with the frequency of the horizontal synchronizing pulses in the reproduced television signal. The generated sawtooth wave is free of distortions caused by noise incorporated in the reproduced horizontal synchronizing pulse train by the reproduction process. Television receiver 10 is operated by the horizontal and vertical synchronizing signals applied thereto to display an accurate picture of the television signal reproduced from magnetic tape 42.

While a particular type of magnetic tape reproducing device 40 is shown in FIGURE 1, the invention is not limited thereto. Other types of magnetic tape reproducing systems may be used in the arrangement of the invention including synchronizing unit 74. In each case synchronizing unit 74 functions in the manner described to produce a sawtooth wave free of distortions due to frequency changes introduced by tape velocity variations. A television signal reproduced from a magnetic tape and processed by the synchronizing unit 74 in the manner described can be accurately displayed by any standard television receiver.

While the synchronizing unit 74 has been shown and described as included only in the horizontal synchronizing circuit, a unit similar to the unit 74 may in certain applications be included in the vertical synchronizing circuit as well.

What is claimed is:

1. A sawtooth wave generating means comprising, in combination, a pulse oscillator arranged to be triggered in response to a train of incoming pulses subject to variations in frequency, a sawtooth wave generator coupled to said pulse oscillator and responsive to the pulse output thereof to produce a sawtooth wave, a phase comparator for comparing said train of incoming pulses and said sawtooth wave and for producing a control signal determined by the timing difference therebetween, means to apply said control signal to said pulse oscillator to cause said pulse oscillator to have an operating frequency approximately equal to that of said train of incoming pulses, said pulse oscillator being responsive to said train of incoming pulses to be directly locked in frequency to that of said incoming pulses, means responsive to said timing difference between said train of incoming pulses and said sawtooth wave for controlling said sawtooth wave generator to vary the slope of said sawtooth wave according to said timing difference, said sawtooth wave generator being operated to produce said sawtooth wave having a constant peak-to-peak amplitude for variations in the frequency of the pulse output of said pulse oscillator, and stabilizing means included in said pulse oscillator for maintaining said pulse oscillator immune to random noise and momentary voids in said train of incoming pulses.

2. A sawtooth wave generating means comprising, in combination, a pulse oscillator arranged to be triggered in response to a train of incoming pulses subject to variations in frequency, a feedback transformer having a stabilizing tuned circuit coupled thereto included in said pulse oscillator, a sawtooth wave generator coupled to said pulse oscillator and responsive to the pulse output thereof to produce a sawtooth wave, a first dual-diode phase comparator for comparing said train of incoming pulses and said sawtooth wave and for producing a control signal determined by the phase difference therebetween, a filter network having a long time constant relative to the frequency of said incoming pulses, means to apply said control signal through said filter network to said pulse oscillator to cause said pulse oscillator to have an operating frequency approximately equal to that of said train of incoming pulses, said pulse oscillator being responsive to said train of incoming pulses to be directly locked in frequency to that of said incoming pulses, a second dual-diode phase comparator for comparing said train of incoming pulses and said sawtooth wave and for producing a second control signal determined by the phase difference therebetween, means included in the slope determining circuit of said sawtooth wave generator responsive to said second control signal to vary the slope of said sawtooth wave according to said second control signal, said sawtooth wave generator being operated by said last-mentioned means to produce said sawtooth wave having a constant peak-to-peak amplitude for variations in the frequency of the pulse output of said pulse oscillator, said stabilizing circuit and said filter network being set to render said pulse oscillator immune to random noise and momentary voids in said train of incoming pulses.

3. A sawtooth wave generating means comprising, in combination, a phase inverter responsive to a train of incoming pulses subject to variations in frequency for producing a first pulse train and a second pulse train, a pulse oscillator having a control element, means for applying said first pulse train to said control element so that said pulse oscillator is triggered by the pulses of said first pulse train, a sawtooth generator coupled to said pulse oscillator and responsive to the pulse output thereof to produce a sawtooth wave, a first dual-diode phase comparator for comparing the pulses in said first and second pulse trains with said sawtooth wave and for producing a control signal determined by the phase difference therebetween, means to apply said control signal to said control element to cause said pulse oscillator to have an operating frequency approximately equal to that of said train of incoming pulses, said pulse oscillator being responsive to said first pulse train to be directly locked in frequency to that of said incoming pulses, a second dual-diode phase comparator for comparing the pulses in said first and second pulse trains with said sawtooth wave and for producing a second control signal determined by the phase difference therebetween, means to apply said second control signal to said sawtooth wave generator to vary the slope of said sawtooth wave according to said second control signal, said sawtooth wave generator being responsive to said second control signal to produce said sawtooth wave having a constant peak-to-peak amplitude for variations in frequency of the pulse output of said pulse oscillator, and stabilizing means included in said pulse oscillator for maintaining said pulse oscillator immune to random noise and momentary voids in said first pulse train and therefore in said train of incoming pulses.

4. A sawtooth wave generating means comprising, in combination, input means to which a train of incoming pulses subject to variations in frequency is applied, a phase inverter coupled to said input means and responsive to said incoming pulses for producing a first and second pulse train of opposite polarities, a pulse oscillator including a control element and a feedback transformer having a stabilizing tuned circuit coupled thereto, amplitude determining means for applying said first pulse train from said phase inverter to said control element so that said pulse oscillator is triggered by the pulses of said first pulse train, a sawtooth generator coupled to said pulse oscillator and responsive to the pulse output thereof to produce a sawtooth wave, a first dual-diode phase comparator for comparing the pulses in said first and second pulse trains with said sawtooth wave and for producing a control signal determined by the phase difference therebetween, a filter network having a long time constant relative to the frequency of said incoming pulses, means to apply said control signal through said filter network to said control element to cause said pulse oscillator to have an operating frequency approximately equal to that of said incoming pulses, said pulse oscillator being responsive to said first pulse train to be directly locked in frequency to that of said incoming pulses, a second dual-diode phase comparator for comparing the pulses in said first and second pulse trains with said sawtooth wave and for producing a second control signal determined by the phase difference therebetween, means included in the slope determining circuit of said sawtooth wave generator responsive to said seocnd control signal to vary the slope of said sawtooth wave according to said second control signal, said sawtooth wave generator being operated by said last-mentioned means to produce said sawtooth wave having a constant peak-to-peak amplitude for variations in the frequency of the pulse output of said pulse oscillator, said stabilizing circuit, said amplitude determining means and said filter network being set to render said pulse oscillator immune to random noise and momentary voids in said first pulse train and therefore said train of incoming pulses.

5. In a magnetic tape reproducing system, a device for reproducing a signal including synchronizing pulses from said magnetic tape such that said synchronizing pulses are subject to frequency variations introduced during the signal reproducing operation, a signal processing circuit, means to apply said reproduced signal from said device to said circuit, means responsive to said reproduced signal to separate said synchronizing pulses therefrom, a synchronizing unit, means to apply said synchronizing pulses to said unit, said synchronizing unit comprising a pulse oscillator arranged to be triggered in response to said synchronizing pulses, a sawtooth wave generator coupled to said pulse oscillator and responsive to the pulse output thereof to produce a sawtooth wave, a first phase comparator for comparing said synchronizing pulses and said sawtooth wave and for producing a control signal determined by the phase difference therebetween, means to apply said control signal to said pulse oscillator to cause said pulse oscillator to have an operating frequency approximately equal to that of said synchronizing pulses, said pulse oscillator being responsive to said synchronizing pulses to be directly locked in frequency to that of said synchronizing pulses, a second phase comparator for comparing said synchronizing pulses and said sawtooth wave and for producing a second control signal determined by the phase difference therebetween, means to apply said second control signal to said sawtooth wave generator to vary the slope of said sawtooth wave according to said second control signal, said sawtooth wave generator being responsive to said second control signal to produce said sawtooth wave having a constant peak-to-peak amplitude for variations in the frequency of the pulse output of said pulse oscillator, stabilizing means included in said pulse oscillator for maintaining said pulse oscillator immune to random noise and momentary voids in said synchronizing pulses, and means for applying said sawtooth wave from said unit to said circuit.

6. In a television magnetic tape reproducing system for use with a television receiver including switching means by which a television signal received over a communication path can be displayed by said receiver, a device for reproducing a television signal including vertical and horizontal synchronizing pulses from said magnetic tape, said synchronizing pulses being subject to variations in frequency introduced during the signal reproducing operation, means to apply said reproduced television signal from said device to said switching means in said receiver, means for separating said vertical and horizontal synchronizing pulses from said reproduced television signal and for feeding said vertical synchronizing pulses to said switching means, a synchronizing unit, means to apply said horizontal synchronizing pulses from said separating means to said synchronizing unit, said synchronizing unit comprising a pulse oscillator arranged to be triggered in response to said horizontal synchronizing pulses, a sawtooth wave generator coupled to said pulse oscillator and responsive to the pulse output thereof to produce a sawtooth wave, a first phase comparator for comparing said horizontal synchronizing pulses and said sawtooth wave and for producing a control signal determined by the phase difference therebetween, means to apply said control signal to said pulse oscillator to cause said pulse oscillator to have an operating frequency approximately equal to that of said horizontal synchronizing pulses, said pulse oscillator being responsive to said horizontal synchronizing pulses to be directly locked in frequency thereto, a second phase comparator for comparing said horizontal synchronizing pulses and said sawtooth wave and for producing a second control signal determined by the phase difference therebetween, means to apply said second control signal to said sawtooth wave generator to vary the slope of said sawtooth wave according to said second control signal, said sawtooth wave generator being responsive to said second control signal to produce said sawtooth wave having a constant peak-to-peak amplitude for variations in the frequency of the pulse output of said pulse oscillator, stabilizing means included in said pulse oscillator for maintaining said pulse oscillator immune to random noise and momentary voids in said horizontal synchronizing pulses, means to apply said sawtooth wave from said synchronizing unit to said switching means, said switching means being operative to cause said receiver to produce an accurate picture of said reproduced television signal in response to said vertical synchronizing pulses and said sawtooth wave.

7. In a television magnetic tape reproducing system for use with a television receiver including switching means by which a television signal received over the conventional radio path can be displayed by said receiver, a device for reproducing a television signal including vertical and horizontal synchronizing pulses from said magnetic tape, said synchronizing pulses being subject to variations in frequency introduced during the signal reproducing operation, means to apply said reproduced television signal from said device to said switching means, means for separating said vertical and horizontal synchronizing pulses from said reproduced television signal and for feeding said vertical synchronizing pulses to said switching means, a synchronizing unit, means to apply said horizontal synchronizing pulses from said separating means to said unit, said synchronizing unit comprising a phase inverter responsive to said horizontal synchronizing pulses for producing a first pulse train and a second pulse train, a pulse oscillator having a control element, means for applying said first pulse train to said control element so that said pulse oscillator is triggered by the pulses of said first pulse train, a sawtooth generator coupled to said pulse oscillator and responsive to the pulse output thereof to produce a sawtooth wave, a first dual-diode phase comparator for comparing the pulses in said first and second pulse trains with said sawtooth wave and for producing a control signal determined by the phase difference therebetween, means to apply said control signal to said control element to cause said pulse oscillator to have an operating frequency approximately equal to that of said horizontal synchronizing pulses, said pulse oscillator being responsive to said first pulse train to be directly locked in frequency to that of said horizontal synchronizing pulses, a second dual-diode phase comparator for comparing the pulses in said first and second pulse trains with said sawtooth wave and for producing a second control signal determined by the phase difference therebetween, means to apply said second control signal to said sawtooth wave generator to vary the slope of said sawtooth wave according to said second control signal, said sawtooth wave generator being responsive to said second control signal to produce said sawtooth wave having a constant peak-to-peak amplitude for variations in frequency of the pulse output of said pulse oscillator, stabilizing means included in said pulse oscillator for maintaining said pulse oscillator immune to random noise and momentary voids in said first pulse train and therefore in said horizontal synchronizing pulses, and means to apply said sawtooth wave from said synchronizing unit to said switching means, said switching means being operative to cause said receiver to produce an accurate picture of said reproduced television signal in response to said vertical synchronizing pulses and said sawtooth wave.

8. In a television magnetic tape reproducing system for use with a television receiver, said receiver including a switching means for normally making said receiver responsive to a television signal received over a conventional radio path, a device for reproducing a television signal including vertical and horizontal synchronizing pulses from said magnetic tape, said synchronizing pulses being subject to variations in frequency introduced by tape velocity variations with respect to the magnetic pick-up means during the reproducing operation, means responsive to said reproduced television signal for separating said reproduced television signal for separating said vertical and horizontal synchronizing pulses and for applying said vertical synchronizing pulses to said switching means, a synchronizing unit, means to apply said horizontal synchronizing pulses from said separating means to said unit, said synchronizing unit comprising input means to which said horizontal synchronizing pulses are applied, a phase inverter coupled to said input means and responsive to said horizontal synchronizing pulses for producing a first and second pulse train of opposite polarities, a pulse oscillator including a control element and a feedback transformer having a stabilizing tuned circuit coupled thereto, amplitude determining means for applying said first pulse train from said phase inverter to said control element so that said pulse oscillator is triggered by the pulses of said first pulse train, a sawtooth generator coupled to said pulse oscillator and responsive to the pulse output thereof to produce a sawtooth wave, a first dual-diode phase comparator for comparing the pulses in said first and second pulse trains with said sawtooth wave and for producing a control signal determined by the phase difference therebetween, a filter network having a long time constant relative to the frequency of said horizontal synchronizing pulses, means to apply said control signal through said filter network to said control element to cause said pulse oscillator to have an operating frequency approximately equal to that of said horizontal synchronizing pulses, said pulse oscillator being responsive to said first pulse train to be directly locked in frequency to that of said horizontal synchronizing pulses, a second dual-diode phase comparator for comparing the pulses in said first and second pulse trains with said sawtooth wave and for producing a second control signal determined by the phase difference therebetween, a second filter network, means included in the slope determining circuit of said sawtooth wave generator responsive to said second control signal applied thereto through said second filter network to vary the slope of said sawtooth wave according to said second control signal, said sawtooth wave generator being operated by said last-mentioned means to produce said sawtooth wave having a constant peak-to-peak amplitude for the variations in the frequency of the pulse output of said pulse oscillator, the time constant of said second filter network being determined so that the slope of said sawtooth wave is not appreciably altered during one rise time, said stabilizing circuit, said amplitude determining means and said first filter network being set to render said pulse oscillator immune to random noise and momentary voids in said first pulse train and therefore said horizontal synchronizing pulses, and means to apply said sawtooth wave to said switching means, said switching means being operative to cause said receiver to produce an accurate picture of said reproduced television signal in response to said vertical synchronizing pulses and said sawtooth wave.

9. In a television magnetic tape reproducing system as claimed in claim 8, said device being adapted to reproduce a television signal from a magnetic tape having the sound component recorded on a first track extending along one edge of the tape, the low frequency portion of the television component of said signal being recorded along a second track extending parallel to said first track along said tape, the high frequency portion of the television component of said signal being recorded along a third track extending parallel to said first and second tracks along said tape, reproduce head means included in said device for reproducing said low and high frequency portions from said second and said third tracks, and means responsive to said reproduced low and high frequency portions for producing a single, wide band television signal for application to said switching means and to said separating means.

No references cited.

UNITED STATES PATENT OFFICE

CERTIFICATE OF CORRECTION

Patent No. 3,091,660 May 28, 1963

William D. Houghton et al.

It is hereby certified that error appears in the above numbered patent requiring correction and that the said Letters Patent should read as corrected below.

Column 1, line 25, for "need" read -- needed --; column 2, lines 3 and 4, for "component" read -- components --; line 6, for "are applied to the proper circuits in the receiver" read -- received in the normal manner by the receiver or --; column 5, line 35, for "gird" read -- grid --; column 10, line 71, for "seocnd" read -- second --.

Signed and sealed this 7th day of January 1964.

(SEAL)
Attest:

ERNEST W. SWIDER

Attesting Officer

EDWIN L. REYNOLDS

Acting Commissioner of Patents